June 10, 1941.  A. E. LECHLEITNER  2,245,206

PHOTOGRAPHIC FILM CORE

Filed Nov. 4, 1939

ALOYSIUS E. LECHLEITNER
INVENTOR

BY
ATTORNEYS

Patented June 10, 1941

2,245,206

UNITED STATES PATENT OFFICE 2,245,206

PHOTOGRAPHIC FILM CORE

Aloysius E. Lechleitner, Rochester, N. Y., assignor to Eastman Kodak Company, Rochester, N. Y., a corporation of New Jersey Application November 4, 1939, Serial No. 302,910

5 Claims. (Cl. 242—71)

The present invention relates to a photographic film core and more particularly to a film core composed of a moldable plastic composition and having a tempered spring member resiliently attached thereto for engagement with a clutch member.

The design of a molded film core is beset with several difficulties especially when such core is to be incorporated in a film magazine and repeated insertions into a camera with a driving clutch member. The principal difficulty is the provision of one or more projections on the film core for engagement with the driving clutch. If such a projection is molded integrally with the core, it is not possible to make the projection thin enough so as to avoid all possibility of interference with the engaging portions of the clutch member when the core or magazine containing the same is inserted into a magazine chamber. Nor is it practical to mold a tempered metal projection into the core because the molding operation is quite apt to remove some of the temper from the projection and render it soft.

The primary object of the present invention is the provision of a photographic film core composed of a moldable plastic composition and having an annular end portion, and a spring member having a circular portion resiliently gripping said annular end portion and having a projection extending beyond the end of the core for engagement with a clutch member.

Another object of the invention is the provision of a photographic film core comprising a cylindrical body having an annular end portion provided with a radial notch and composed of a moldable plastic composition, and a spring member having a circular portion encircling and resiliently gripping said annular end portion and having an off-set projection within said radial notch and extending beyond the end of said body and said annular end portion.

Other objects of the invention will be apparent to those skilled in the art from the following disclosure.

Reference is hereby made to the accompanying drawing wherein similar reference characters designate similar elements and wherein.

Figure 1:
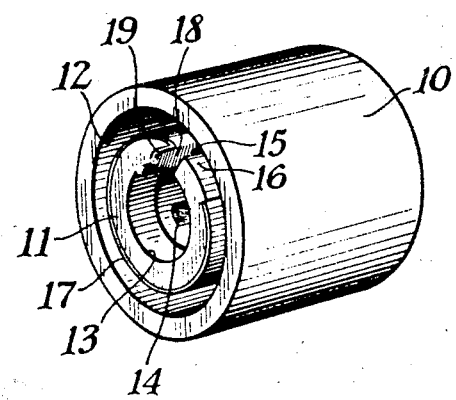
Fig. 1 is a perspective view of a film core carrying a spring member according to the invention.
Figure 2:
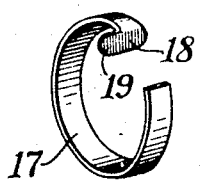
Fig. 2 is a perspective view of said spring member.
Figure 3:
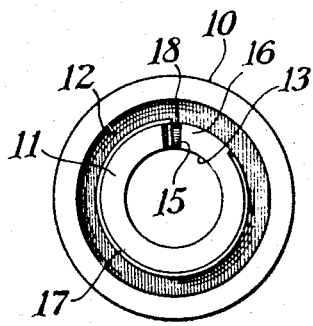
Fig. 3 is an end view of the cylindrical film core carrying the spring member.

In the illustrated embodiment of the invention, the film core comprises a cylindrical body 10 around which the film may be wound in a known manner. An annular end portion 11 is molded integrally with the body 10 which is also provided with an annular groove 12. The cylindrical body 10 may be provided with an axial spindle opening 13 and with a pair of opposed slots 14. Said annular end portion 11 is provided with a radial notch 15 and has a radial shoulder 16 adjacent said notch 15.

The film core, as above described, is composed of a moldable plastic composition which may be of the thermosetting or thermoplastic type. Preferably, the film core is molded from a thermosetting plastic or phenol formaldehyde condensation product, such as "Bakelite."

Figure 4:
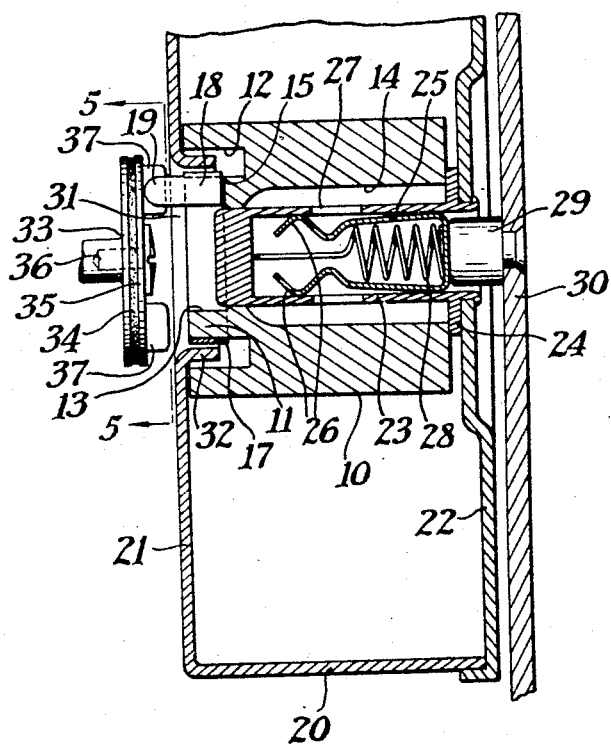
Fig. 4 is a transverse fragmentary section through a film magazine and associated apparatus showing the driving connection between the clutch member of the apparatus and the projection on said core.
Figure 5:
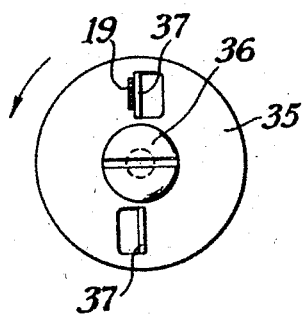
Fig. 5 is an end view of the clutch member of the apparatus and a section of the projection on the core taken on the line 5—5 of Fig. 4.

The spring member which encircles and resiliently grips a portion of the film core comprises a circular portion or band 17 having an off-set projection 18. Said off-set projection 18 has a rounded end 19. When the spring member is fastened to the film core, the circular band 17 encircles the peripheral wall of end portion 11, has one end abutting an end of radial shoulder 16, and has its other end or off-set portion 18 within the radial notch 15. The rounded end 19 of off-set portion 18 extends beyond the ends of cylindrical body 10 and annular end portion 11, see Figs. 1 and 4.

Said spring member may be composed of any suitable spring material and is preferably made of tempered steel stock. Specifically, the spring member may be cut and formed from annealed sheet metal and then tempered to render it hard and resilient.

In addition to obtaining an extremely hard projection on a molded film core, it is also possible to obtain a very thin projection which has small likelihood of interfering with a driving clutch but without any appreciable sacrifice in strength. Such interference between the projection on the film core and engaging portions of a clutch member is particularly objectionable during the loading of a film magazine including the ordinary molded film core. This advantage of the present invention will be better understood by a fuller explanation of its use in a film magazine associated with a photographic apparatus of the magazine type, see Fig. 4.

The film magazine comprises a casing 20 having a side wall 21 and a cover 22. A hollow spindle member 23 has a collar 24 and is riveted to said cover 22. A U-shaped spring member 25 has bent portions 26 which normally extend through slots 27 in spindle member 23 to engage the slots 14 in cylindrical body 10. The coil spring 28 normally urges the U-shaped spring member 25 and its bent portions 26 to such engaging position. A stud 29 on the camera cover 30 is adapted, when said camera cover is closed, to move said spring member 25 axially and disengage said bent portions 26 from the slots 14 so that the cylindrical body 10 or film core may rotate freely upon said spindle member 23. Such core locking construction is more completely described in Fairbanks U. S. Patent No. 2,161,341, issued June 6, 1939.

The side wall 21 of the film magazine is provided with an opening 31 and has a collar 32 around said opening 31. Said collar 32 fits into the annular groove 12 of the cylindrical body 10 to form a light-tight connection between the film core and magazine wall. At the same time the annular end portion 11 and circular spring band 17 are within said collar 32 and rounded end 19 may extend to the exterior of the film magazine. A driving clutch member may comprise a clutch spindle 33, a friction disk 34, a clutch disk 35, and a screw 36 passing through said disk 34 and said clutch disk 35 and for pressing said disks against the clutch spindle 33 to create any desired friction drive. Of course, such clutch member may be of any conventional construction but preferably has a pair of thin driving fins 37 which may be bent out of the material of clutch disk 35 and which may also be hardened.

Since the rounded end 19 of the off-set projection 18 of the spring member is very thin and since the fins 37 of the clutch member are also very thin, it is apparent that there is very little possibility of these members abutting each other end to end when the film magazine is inserted into the magazine chamber. However, this thinness of the driving clutch elements is obtained without any sacrifice in strength, principally because the spring member on the film core is separately provided and may be separately tempered and hardened.

Since other modifications of the invention are deemed to be within the ambit of the invention, the present disclosure is merely illustrative and the scope of the invention is defined by the claims which follow.

Having now particularly described my invention what I desire to secure by Letters Patent of the United States and what I claim is:

1. A film core comprising a cylindrical body composed of a moldable plastic composition and having a pair of annular end portions and provided with an annular groove therebetween, and a spring member having a circular portion within said annular groove resiliently gripping one of said annular end portions and having a projection extending beyond the end of said body and annular end portions for engagement with a clutch member.

2. A film core comprising a cylindrical body composed of a moldable plastic composition, an annular portion on one end of said body and having a radial shoulder, and a spring member of tempered spring metal, having a circular portion resiliently gripping said annular end portion with one end adjacent said radial shoulder and a projection on the other end extending beyond the end of said body and annular end portion.

3. A film core comprising a cylindrical body having an annular end portion provided with a radial notch, and a spring member having a circular portion encircling and resiliently gripping said annular end portion and having an off-set projection within said radial notch and extending beyond the end of said body and annular end portion.

4. A film core comprising a cylindrical body, an integral annular end portion on one end of said body, having a radial shoulder on the peripheral wall thereof and provided with a radial notch adjacent said shoulder, and a spring band having a circular portion for encircling and resiliently gripping said peripheral wall of said annular end portion between said shoulder and said notch, and having an off-set tongue within said radial notch and extending beyond the end of said body and annular end portion.

5. A film core comprising a cylindrical body composed of a phenol formaldehyde condensation product and provided with an axial hole, an integral annular end ring on one end of said body, having a radial shoulder extending from the peripheral wall of said end ring, and provided with a radial notch adjacent said shoulder, and a spring band of tempered spring steel, having a circular portion for encircling and resiliently gripping said peripheral wall between said shoulder and said notch, and having an off-set tongue within said axial notch and extending beyond the end of said body and annular end ring.

ALOYSIUS E. LECHLEITNER.